(12) United States Patent
Bach et al.

(10) Patent No.: US 8,598,892 B2
(45) Date of Patent: Dec. 3, 2013

(54) METHOD FOR DETECTING DETACHMENT OF A REINFORCING COMPONENT

(75) Inventors: Martin Bach, Bremen (DE); Marc Baulenas, Barcelona (ES)

(73) Assignee: Airbus Operations GmbH, Hamburg (DE)

(*) Notice: Subject to any disclaimer, the term of this patent is extended or adjusted under 35 U.S.C. 154(b) by 361 days.

(21) Appl. No.: 13/004,404

(22) Filed: Jan. 11, 2011

(65) Prior Publication Data
US 2011/0187391 A1    Aug. 4, 2011

Related U.S. Application Data

(63) Continuation of application No. PCT/EP2009/058793, filed on Jul. 10, 2009.

(60) Provisional application No. 61/134,627, filed on Jul. 11, 2008.

(30) Foreign Application Priority Data

Jul. 11, 2008  (DE) .................. 10 2008 040 368

(51) Int. Cl.
*G01R 27/26* (2006.01)
*G01R 31/08* (2006.01)

(52) U.S. Cl.
USPC ............................ 324/658; 324/676; 324/519

(58) Field of Classification Search
USPC ................... 324/663, 658, 519, 676
See application file for complete search history.

(56) References Cited

U.S. PATENT DOCUMENTS

| | | | |
|---|---|---|---|
| 3,443,220 A * | 5/1969 | Spademan | 324/683 |
| 5,245,293 A | 9/1993 | Runner | |
| 6,002,259 A * | 12/1999 | Griffin et al. | 324/456 |
| 7,589,457 B2 * | 9/2009 | Lee et al. | 310/338 |
| 2007/0213943 A1 | 9/2007 | Curry et al. | |
| 2009/0219647 A1 * | 9/2009 | Hunt et al. | 360/77.01 |

FOREIGN PATENT DOCUMENTS

| | | |
|---|---|---|
| GB | 2187291 A | 9/1987 |
| GB | 2435519 A | 8/2007 |
| WO | WO2006086041 A2 | 8/2006 |
| WO | WO2007002266 A2 | 1/2007 |

OTHER PUBLICATIONS

German Office Action for DE 10 2008 040 368 dated Sep. 28, 2009.
International Search Report for PCT/EP2009/058793 (WO 2010004019A1) dated Oct. 22, 2009.

* cited by examiner

*Primary Examiner* — Amy He
(74) *Attorney, Agent, or Firm* — Jenkins, Wilson, Taylor & Hunt, P.A.

(57) ABSTRACT

A method for detecting detachment of a reinforcing component that is attached to a body skin component of a vehicle body of a vehicle, the body skin component and the reinforcing component forming an electric capacitor together with an intermediate adhesive layer, said capacitor having a capacitance that changes if there is at least partial detachment of the body skin component from the reinforcing component, the capacitance of the capacitor or a change in the capacitance of the capacitor being measured in order to detect detachment of the reinforcing component.

13 Claims, 3 Drawing Sheets

METHOD FOR DETECTING DETACHMENT OF A REINFORCING COMPONENT

CROSS-REFERENCE TO RELATED APPLICATIONS

This application is a continuation of PCT/EP2009/058793 filed Jul. 10, 2009, and claims the benefit of U.S. Provisional Application No. 61/134,627, filed Jul. 11, 2008 and German Patent Application No. 10 2008 040 368.7, filed Jul. 11, 2008, the entire disclosures of which are herein incorporated by reference.

FIELD OF THE INVENTION

The invention relates to a method for detecting detachment of a reinforcing component that is fastened to a body skin component of a vehicle body.

Vehicles of lightweight construction are being produced increasingly, the saving in weight leading to minimisation of fuel consumption.

The vehicle body of an aircraft can consist of a plurality of sections. One section consists of structural component parts or structural components, such as formers, longitudinal reinforcing elements and body skin components fastened thereto. FIG. 1 shows the basic structural assembly of a vehicle body. Stabilising struts or stringers extend in the longitudinal direction of the vehicle and are attached to transverse formers extending transverse to the longitudinal axis of the body. The stabilising struts or stringer components and the transverse formers give the vehicle body a robust cross-sectional shape. The body skin components can be riveted to the reinforcing components, i.e. to the longitudinal reinforcements and transverse formers, and form a 'shell'. A plurality of shells form a section of the body that is also referred to as a 'barrel'.

During assembly and operation of the vehicle, a planar reinforcing member may become detached, in part or completely, from a body skin component under load. Detachment of reinforcing components is critical for safety, particularly in aircraft. After vehicle production, external visual checks of the vehicle shell are carried out as part of quality control procedures in order to identify any detached body skin components or reinforcing components. These checks are very time-consuming. In addition, an internal visual check may also be carried out after disassembly of internal cladding parts, although these checks are even more time-consuming.

SUMMARY OF THE INVENTION

It is therefore an object of the present invention to provide a method for determining partial or complete detachment of a reinforcing component that can be performed with minimal effort and in a short period of time.

The invention provides a method for detecting detachment of a reinforcing component that is attached to a body skin component of a vehicle body of a vehicle,
the body skin component and the reinforcing component forming an electric capacitor together with an intermediate adhesive layer, said capacitor having a capacitance that changes if there is at least partial detachment of the reinforcing component from the body skin component,
the capacitance of the capacitor or a change in capacitance being measured in order to detect detachment of the reinforcing component.

In an embodiment of the method according to the invention, an AC voltage signal with adjustable frequency is applied to the capacitor in order to measure its capacitance.

In an embodiment of the method according to the invention, an electric pulse is conducted along the capacitor.

In an embodiment of the method according to the invention, the measured capacitance of the electric capacitor is compared to a setpoint capacitance.

In an embodiment of the method according to the invention, an at least partial detachment of the reinforcing component is detected if a deviation between the measured capacitance and a setpoint capacitance exceeds an adjustable tolerance threshold value.

In an embodiment of the method according to the invention, an at least partial detachment of the reinforcing component is detected if a change in capacitance is detected by backscatter measurement.

The invention further provides a vehicle body comprising reinforcing components that are attached to body skin components, the body skin components and the reinforcing components forming one or more capacitors together with intermediate adhesive layers, said capacitors having capacitances that change if there is at least partial detachment of a reinforcing component from a body skin component, the capacitances or changes in capacitances of the capacitors being measurable in order to detect detachment of the reinforcing component.

In an embodiment of the vehicle body according to the invention, the reinforcing components and the body components consist of metal or carbon fibre reinforced plastics material (CFRP).

In an embodiment of the vehicle body according to the invention, the adhesive layer consists of a dielectric material.

In an embodiment of the vehicle body according to the invention, an electric AC voltage signal with adjustable frequency generated by a generator is applied to the reinforcing component or to the body skin component in order to measure the capacitances.

In an embodiment of the vehicle body according to the invention, an electric pulse generated by a generator is conducted along the reinforcing component or along the body skin component in order to detect changes in capacitance.

In an embodiment of the vehicle body according to the invention, the reinforcing component is a stabilising strut extending in the longitudinal direction of the vehicle body.

In an embodiment of the vehicle body according to the invention, said vehicle body is a vehicle body of an aircraft.

Further preferred embodiments of both the method according to the invention for detecting detachment of a reinforcing component and of the vehicle body according to the invention are described with reference to the accompanying figures in order to illustrate the features essential to the invention.

DESCRIPTION OF EXEMPLARY EMBODIMENTS

Figure 1:
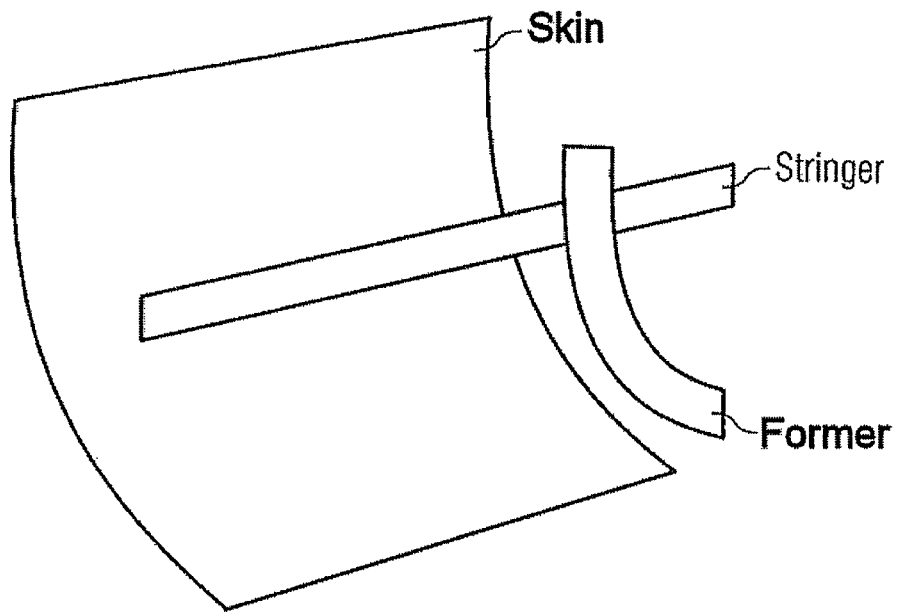
FIG. 1 shows a conventional structural assembly of a vehicle body.
Figure 2:
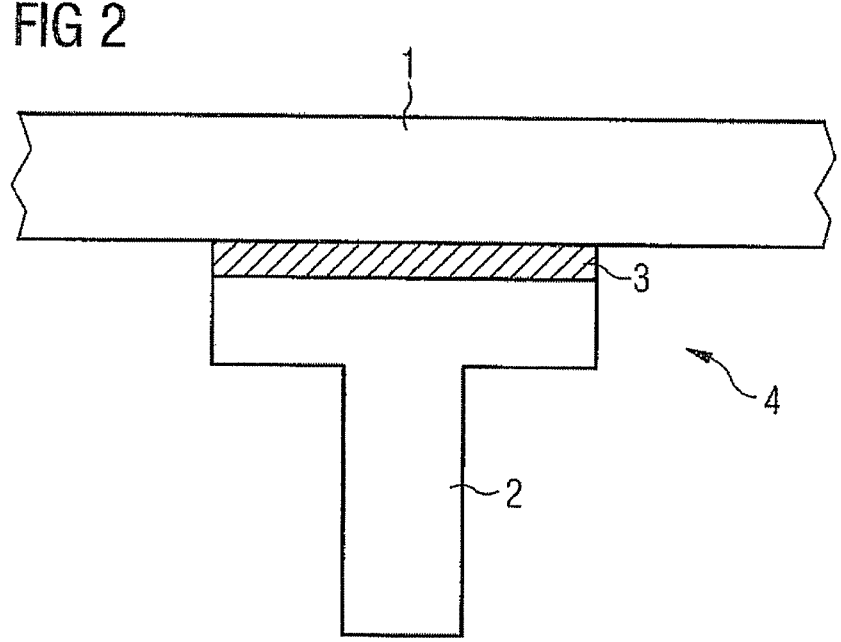
FIG. 2 is a sectional view of a connection point between the body skin component and a reinforcing component in a vehicle body according to the invention.

As can be seen from FIG. 2, in the case of a vehicle body a body skin component 1 is attached to a reinforcing component 2, i.e. adhered via an adhesive layer 3. The adhesive layer 3 forms a dielectric layer between the body skin component 1 and the reinforcing component 2. In addition to the adhesive layer, the body skin component 1 and the reinforcing component 2 also may be interconnected via additional fastening means, for example via insulated rivets or the like. In a possible embodiment the dielectric layer 3 consists of epoxy adhesive. The body skin component 1 and the reinforcing component 2 form an electric capacitor 4 together with the intermediate adhesive layer 3.

The capacitance C of the capacitor 4 is given by the following equation:

$$C = \varepsilon_0 \cdot \varepsilon_r \cdot \frac{A}{d}$$

where $\varepsilon_0$ is vacuum permittivity,
$\varepsilon_r$ is the dielectric permittivity of the adhesive material,
A is the adhesive area, and
d is the distance between the body skin component 1 and the reinforcing component 2 or the thickness of the adhesive layer 3.

If the reinforcing component 2 becomes detached, either completely or in part, from the body skin component 1, the capacitance C of the capacitor 4 will change. The capacitance C of the capacitor 4 is measured in order to detect partial or complete detachment of the reinforcing component 2 from the body skin component 1. For example the reinforcing component 2 is a stabilising strut that extends in the longitudinal direction or in the transverse direction of the vehicle body. The vehicle may be any vehicle, for example a motor vehicle or an aircraft.

FIG. 2 shows a connection point between a body skin component and a reinforcing component 2. In a vehicle body a plurality of connection points for different reinforcing components 2 may also be provided for each body skin component 1, in each case a dielectric adhesive layer 3 being arranged between the body skin component 1 and the reinforcing component 2. These connection points form capacitors C, which are connected in parallel.

The body skin component 1 and the reinforcing component 2 consist of lightweight materials. In a possible embodiment the body component 1 and the reinforcing component 2 consist of a fibre composite material, and in particular consist of carbon fibre reinforced plastics materials (CFRPs). In an alternative embodiment the body skin component 1 and the reinforcing component 2 consist of a lightweight metal material, for example aluminium or titanium.

Figure 3:
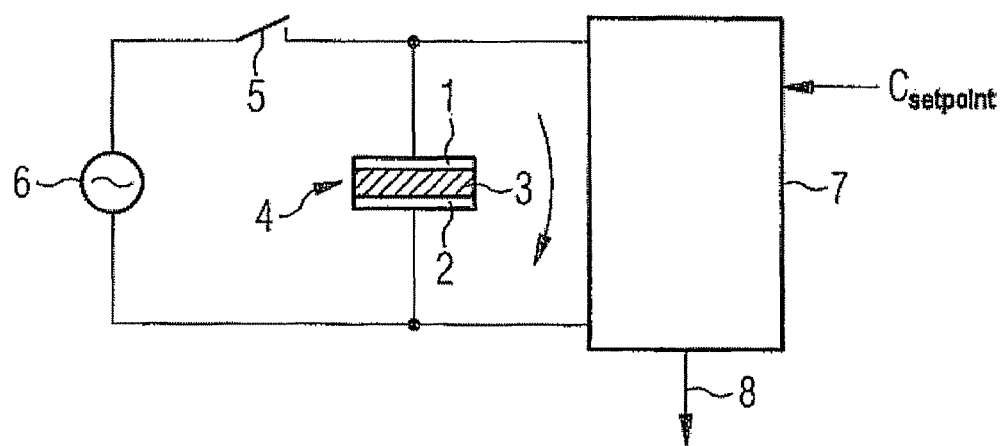
FIG. 3 shows a measurement assembly for detecting detachment of a body skin component in order to illustrate the detection method according to the invention.

FIG. 3 shows a measurement assembly for carrying out the method according to the invention for detecting detachment of a reinforcing component 2.

The body skin component 1 and the reinforcing component 2 form a capacitor 4 with the intermediate adhesive layer 3, said capacitor being connectable via a switch 5 to a generator 6 that supplies an electric AC voltage signal AC with adjustable frequency f. A measurement device 7 measures the voltage drop U across the capacitor 4 and thus determines the capacitance C of the capacitor 4. In the embodiment of the measurement assembly illustrated in FIG. 3 the measured capacitance C of the electric capacitor 4 is compared to a setpoint capacitance $C_{setpoint}$. The measurement device 7 detects detachment of the reinforcing component 2 from the body skin component 1 if a deviation ΔC between the measured capacitance C of the capacitor 4 and the setpoint capacitance $C_{SETPOINT}$ exceeds an adjustable tolerance threshold value. In this instance the measurement device 7 emits a warning signal via a line 8. The body skin component 1 in question can then be checked visually by maintenance staff. The AC voltage generator 6 may be an internal AC voltage generator of the vehicle, for example of the aircraft. In an alternative embodiment an external AC voltage generator 6 is used. In a possible embodiment the measurement device 7 is also integrated within the vehicle, for within the aircraft.

In a possible embodiment the setpoint capacitance $C_{SETPOINT}$ is measured after production of the vehicle and is stored in a memory. Checks are then carried out at regular intervals to determine whether the capacitance C of the capacitor 4 has, or has not changed. A change in the capacitance C may be an indication of a partially detached body skin component 1.

Figure 4:
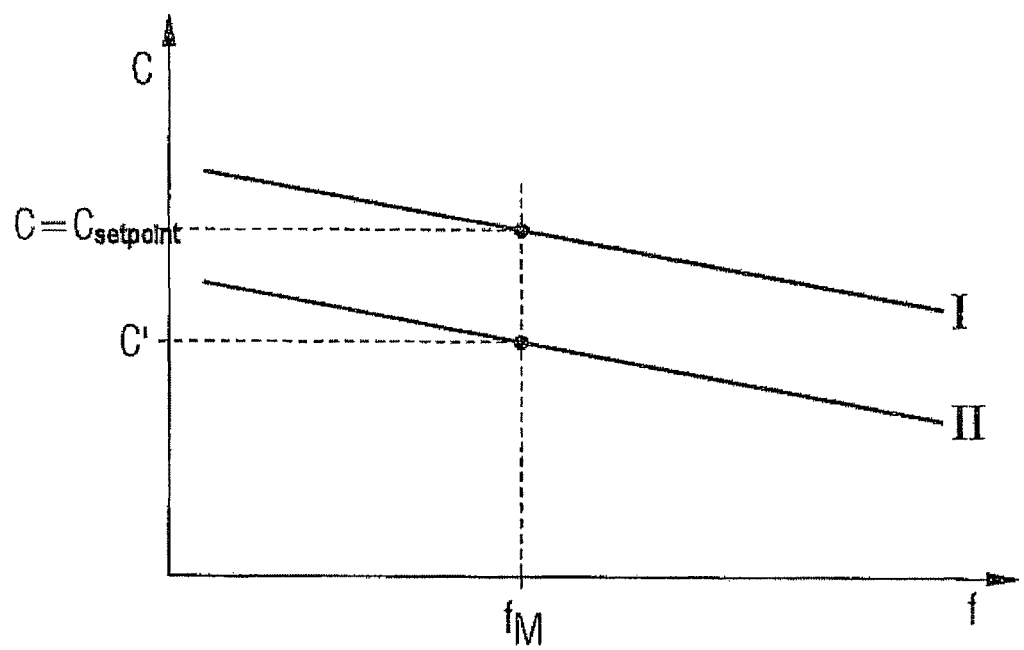
FIG. 4 is a signal graph illustrating an embodiment of the detection method according to the invention.

FIG. 4 shows a graph illustrating the detection method according to the invention for the measurement assembly illustrated in FIG. 3. The curve I shows the frequency dependence of an intact capacitor, i.e. the capacitor 4, of which the body skin component is rigidly adhered to the respective reinforcing component 2. Capacitance decreases with increasing frequency f of the AC voltage signal applied. If the capacitor 4 becomes damaged or if the reinforcing component 2 becomes detached from the respective body skin component 1, the capacitance C of the capacitor 4 decreases, as is illustrated by the line II in FIG. 2. The capacitance C of the intact capacitor 4 thus corresponds to the measured and optionally temporarily stored setpoint capacitance $C_{SETPOINT}$ at a predetermined measurement frequency $f_M$. Once the capacitor 4 has been damaged its capacitance C decreases to the capacitance C' at the measurement frequency $f_M$. If the capacitance C' deviates too much from the original capacitance C, i.e. if an adjustable tolerance threshold value is exceeded, the measurement device 7 emits a warning signal and the corresponding body skin component 1 is inspected.

Figure 5:
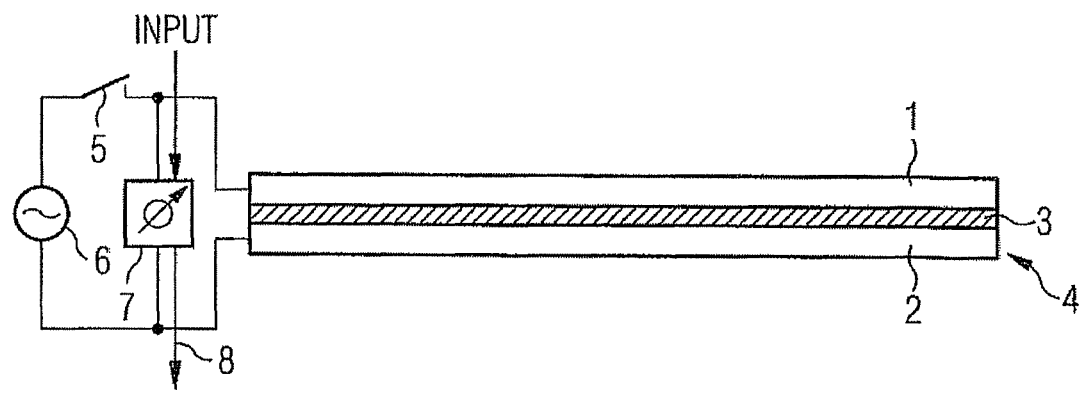
FIG. 5 shows an alternative measurement assembly for detecting detachment of a body skin component in order to illustrate the detection method according to the invention.
Figure 6:
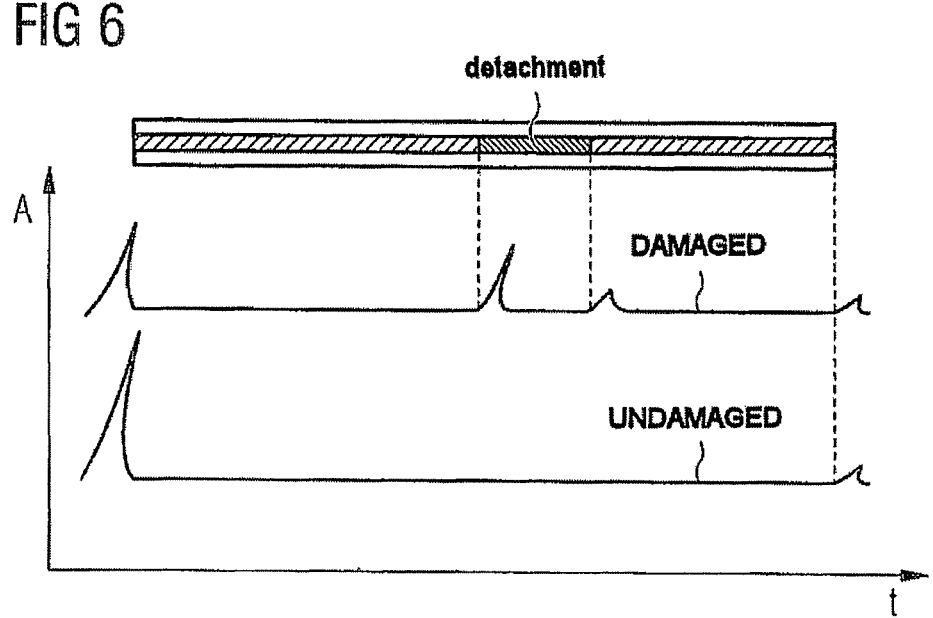
FIG. 6 is a signal graph illustrating a further embodiment of the detection method according to the invention.

FIG. 5 shows an alternative measurement assembly for carrying out the method according to the invention. At least one signal pulse generated by the signal generator 6 is fed to one of the two plates 1, 2 of the above-described capacitor 4, whilst the respective other plate of the capacitor 4 acts as earthing. This signal pulse is reflected, at least in part, at detachments or detachment points that change the capacitance of the capacitor 4. FIG. 6 shows an amplitude-time graph illustrating this backscatter measurement. The upper signal curve is given in the case of at least partial detachment whilst the lower signal curve reflects an undamaged or attached body skin component.

The method according to the invention can be used not only to detect detachment of the reinforcing component 2, but also to check whether the adhesive layer 3 has a desired setpoint thickness $d_{SETPOINT}$.

The method according to the invention makes it possible to carry out a quick check without the need for complex disassembly of vehicle parts. The method according to the invention makes it possible to detect detachment of a reinforcing component 2, i.e. for example a stringer or reinforced CFRP structures, in pressurised or unpressurised regions. The method according to the invention may be carried out as part of quality control procedures after production of the vehicle or aircraft. Furthermore, the method according to the invention may be carried out during maintenance. In a possible embodiment the method according to the invention may also be implemented during operation of the vehicle. The vehicle may be any vehicle of lightweight construction, for example a motor vehicle, an aircraft, a rail vehicle or a maritime vessel.

The invention claimed is:

1. A method for detecting detachment of a reinforcing component that is attached to a body skin component of a vehicle body of a vehicle, wherein the body skin component and the reinforcing component form an electric capacitor together with an intermediate adhesive layer, said capacitor having a capacitance that changes if there is at least partial detachment of the reinforcing component from the body skin component, wherein at least one signal pulse is applied to the body skin component or the reinforcing component, wherein the signal pulse is generated by a signal generator and wherein the signal pulse is at least partially reflected at points of detachment for backscatter measurement, wherein the points of detachment provoke a change of the capacitance of the capacitor and wherein the backscatter is measured.

2. The method according to claim 1, wherein an AC voltage signal with adjustable frequency which is generated by the signal generator is applied to the electric capacitor in order to measure its capacitance.

3. The method according to claim 1, wherein the measured capacitance of the electric capacitor is compared to a setpoint capacitance.

4. The method according to claim 1, wherein detachment of the reinforcing component is detected if a deviation between the measured capacitance and a setpoint capacitance exceeds an adjustable tolerance threshold value.

5. The method according to claim 1, wherein the backscatter measurement is carried out by a measurement unit that is coupled to the body skin component and the reinforcing component.

6. The method according to claim 5, wherein the signal generator and the measurement unit are integrated in the vehicle and wherein the detachment of a reinforcing component is detected during operation of said vehicle.

7. A vehicle body comprising body skin components that are attached to reinforcing components, wherein the body skin components and the reinforcing components form one or more electric capacitors together with the intermediate adhesive layers, said capacitors having capacitances that change if one or more reinforcing components become detached from respective body skin components, wherein a signal generator is provided that, when in use, generates at least one signal pulse, wherein the signal pulse is applied to the body skin component or the reinforcing component, wherein the applied signal pulse is at least partially reflected at points of detachment for backscatter measurements, wherein the points of detachment provoke a change of the capacitance of the capacitor and wherein a measurement unit is provided for the backscatter measurement.

8. The vehicle body according to claim 7, wherein the reinforcing components and the body skin components consist of metal or carbon fibre reinforced plastics material.

9. The vehicle body according to either claim 7, wherein the adhesive layer consists of a dielectric material.

10. The vehicle body according to claim 7, wherein an AC voltage signal with adjustable frequency generated by a generator can be applied to the reinforcing component or to the body skin component in order to measure the capacitances.

11. The vehicle body according to claim 7, wherein the reinforcing component is a stabilising strut extending in the longitudinal or transverse direction of the vehicle body.

12. The vehicle body according to claim 7, wherein the vehicle is an aircraft.

13. The vehicle body according to claim 7, wherein the signal generator is integrated in the vehicle.

* * * * *